United States Patent [19]

Kaku et al.

[11] Patent Number: 4,745,563

[45] Date of Patent: May 17, 1988

[54] METHOD OF DETECTING THE SPEED OF A MOTOR USING DISTURBANCE COMPENSATION

[75] Inventors: Yasuhiko Kaku, Kitakyushu; Nobuhiro Kyura, Munakata, both of Japan

[73] Assignee: Yaskawa Electric Mfg. Co., Ltd., Japan

[21] Appl. No.: 702,181

[22] Filed: Feb. 15, 1985

[30] Foreign Application Priority Data

Feb. 17, 1984 [JP] Japan ................................. 59-27237

[51] Int. Cl.$^4$ ..................... G06F 15/46; G05B 11/14
[52] U.S. Cl. .................................... 364/565; 318/636; 364/577
[58] Field of Search ............... 364/511, 556, 565, 577, 364/723; 318/326, 327, 632, 636

[56] References Cited

U.S. PATENT DOCUMENTS

| | | | |
|---|---|---|---|
| 3,669,626 | 6/1972 | Thiers et al. | 364/577 |
| 3,978,325 | 8/1976 | Goldstein et al. | 364/577 |
| 4,181,432 | 1/1980 | Flower | 364/565 |
| 4,254,470 | 3/1981 | Jordan | 364/577 |
| 4,288,872 | 9/1981 | Tamburelli | 364/724 |
| 4,362,978 | 12/1982 | Pollard et al. | 318/632 |
| 4,368,412 | 1/1983 | Inoue | 318/632 |
| 4,387,327 | 6/1983 | Kralowetz et al. | 364/723 |
| 4,446,409 | 5/1984 | Rawicz et al. | 318/632 |
| 4,563,735 | 1/1986 | Hiroi et al. | 318/632 |

Primary Examiner—Parshotam S. Lall
Assistant Examiner—Daniel W. Juffernbruch
Attorney, Agent, or Firm—McGlew and Tuttle

[57] ABSTRACT

The speed of a motor or a moving body driven by a motor is detected by interpolating by an estimated speed the speed between pulse signals generated by a pulse generator. The estimated speed is obtained by updating a variable presenting the torque disturbance obtained by compensating for a variable representing a motor torque by a variable representing a torque disturbance synchronously with a sampling pulse of a predetermined interval, and the initial value of the estimated speed on a compensatory amount of the torque disturbance is updated each time the pulse generator generates a pulse. In the prior art, the mean speed of the present pulse signal section was regarded as the initial value in the immediately following pulse signal section, while in the present invention, the real (spontaneous) speed is obtained when the pulse generator generates a pulse signal, and this real speed is regarded as the initial value of the estimated speed of the immediately following pulse signal section. Said real speed can be precisely obtained by utilizing the fact that an error in the interpolated estimated speed can be ascertained by obtaining the amount of change in the variable representing the torque disturbance.

3 Claims, 12 Drawing Sheets

METHOD OF DETECTING THE SPEED OF A MOTOR USING DISTURBANCE COMPENSATION

BACKGROUND OF THE INVENTION

1. Field of the Invention

The present invention relates to a method of detecting the speed of a motor or a moving body driven by a motor, and more particularly to a method of detecting the speed of a motor or a moving body driven by a motor when the motor operates at a low speed.

2. Description of the Prior Art

Means for detecting the speed and position of a motor and a moving body driven by the motor include a tachogenerator employed for the detection of speed and a pulse generator employed for the detection of position. Since the speed can also be detected by the pulse generator, a method is practiced of detecting the position and speed of a motor or a moving body driven thereby, by using a pulse generator only as a detector because the use of only the pulse generator helps in terms of cost.

Various methods have been proposed for detecting the speed using a pulse generator.

FIG. 1 of the accompanying drawings illustrates one prior method. A pulse generator 102 generates one pulse each time the shaft of a motor 101 rotates through an angular interval $\Delta X$ determined by the hardware of a pulse generator. The output pulses of the pulse generator 102 are counted by a counter 103 for a certain sampling interval $\Delta T$. The count value of the counter 103 is transferred to a register 104 each time a sampling pulse is applied to the register 104. The counter 103 is reset and the value stored in the register 104 is read by a microcomputer 105, which then effects the following arithmetic operation on the read data to detect the speed of the motor 101:

$$V = \frac{N}{\Delta T} \times \Delta X = N \frac{\Delta X}{\Delta T} \quad (1)$$

The speed computed according to the equation (1) has a digital value, which is stored in a register in the microcomputer 105.

The analog value of the speed can be derived by applying the digital value to a digital-to-analog converter.

Speed control can be realized by applying the speed value to a servo system actually in use, in spite of applying a speed detecting signal of a tachogenerator.

With the above method, however, the counter 103 only counts N pulses corresponding to an angle $\theta n$ or $N \times \Delta X$ during one sampling interval between sampling pulses SP1 and SP2, although the motor actually rotates through an angle $\theta r$, with the result that a counting error of up to about one pulse at maximum may be produced. Although this error is negligible when the value of N is large as in high-speed rotation, the value of N is reduced as the motor speed is lowered, and accurate speed detection cannot be made. In particular, if the period of pulses is longer than the sampling interval, the detected speeds will become intermittent making speed control unstable in the control system.

For detecting the speed accurately while the motor rotates at a low speed, it is necessary to increase the number of pulses generated per revolution of the pulse generator or to increase the sampling interval $\Delta T$.

However, the number of pulses that can be produced by the pulse generator is limited due to the size and cost of the detector, and the sampling interval has to be 1 millisec. or shorter in view of the response of the speed control system. Assuming that the number of pulses produced while the pulse generator makes one revolution is ten thousands and the sampling interval is 1 millisec., the period of pulses generated by the pulse generator when the motor rotates at a low speed of 1 rpm is 6 millisec. This means that one pulse is generated in six successive sampling intervals, and that the speed as computed according to the equation (1) becomes intermittent as shown in FIG. 3, a condition in which accurate speed cannot be detected.

There has been proposed a method to be effected by an arrangement shown in FIG. 4 for accurately detecting the speed while the motor rotates at a low speed. In FIG. 4, 112 denotes a clock pulse generator, 113 a counter, 114 a register, and 115 a circuit for discriminating the direction of rotation.

When the pulse generator produces one pulse (PG1) as shown in FIG. 5, the count of the counter 113 is transferred to the register 114 in FIG. 4 and the counter 113 is reset and starts counting clock pulses generated by the clock pulse generator 112. When the pulse generator generates a second pulse (PG2), the count (N in FIG. 5) of the counter 113 is transferred to the register 114, and the counter 113 is reset to start counting clock pulses.

The value (N) in the register 114 is read by the microcomputer 105, which computes a speed V according to the following equation:

$$V = \Delta X / TcN \quad (2)$$

where $\Delta X$ is the rotational angle per pulse of the pulse generator, Tc the period of clock pulses produced by the clock generator, and N is the count of the counter.

If ten thousand pulses are generated per revolution of the pulse generator and the clock frequency is 100 KHz, then the equation (2) is changed to the equation (3):

$$V = \left[ \left( \frac{1}{10000} \right) / \left( \frac{1}{100 \times 1000} \right) \right] \times \frac{1}{N} \quad (3)$$

$$= \frac{10}{N} \text{ (rps)}$$

$$= \frac{600}{N} \text{ (rpm)}$$

If the motor rotates at a low speed of 1 rpm, the interval of time between the pulses PG1 and PG2 in FIG. 5 is 6 millisec., and the count of the counter 113 is 600, so that the speed can be determined according to the equation (3). With this method, the value of N becomes greater as the speed of rotation of the motor is higher. Thus, the speeds can be detected without interruption as shown in FIG. 3.

However, the detected speeds are stepwise as shown in FIG. 5 and will deviate widely from the actual speed when the speed changes sharply as in acceleration or deceleration.

Further, inasmuch as the clock pulses between PG1 and PG2 are counted to determine an average speed the value of which is held from PGS to PG3, the speed detected the moment the pulse PG2 is generated is not an instantaneous speed at PG2, but an instantaneous speed at a midpoint substantially between PG1 and PG2, and is thus delayed by a time equal to half the time interval between PG1 and PG2.

Generally, the response characteristics of a control system are poor if there is a delay in detecting the variable to be controlled.

In the above method, therefore, there is a delay element in the speed loop which fails to increase the gain of the speed loop, so that the response characteristics of the speed control system becomes worse. This drawback becomes serious in low-speed rotation since the delay time is increased.

For accurate positioning control, for example, the speed of movement of an object to be positionally controlled becomes progressively lower as the object approaches a target position and the speed of movement falls to zero at the target position.

To accomplish rapid and accurate positioning, therefore, the control system is required to respond quickly to a positioning command signal particularly when the object approaches in the vicinity of the target position. Therefore, the loop gain of the speed control system must be sufficiently large.

With the conventional arrangement as described above, however, the delay time becomes longer as the speed is lower and hence it becomes more and more difficult to increase the loop gain at lower speeds.

There has also been proposed a method of detecting an actual speed more accurately (see, for example, Japanese Patent Laid-Open Publication No. 203959/1982 entitled "Method of Detecting the Speed of a Synchronous Motor").

The above proposed method can be applied to an arrangement as shown in FIG. 6, for example. In FIG. 6, 121 denotes a DC motor, 122 a power amplifier for driving the DC motor 121, 124 an analog-to-digital converter, 125 a current detector, 126 an interrupt pulse generator, 127 a microcomputer, and 123 a flip-flop which can be set by a pulse PG generated by the pulse generator 102 and reset by a speed computation end signal RT issued by the microcomputer 127.

It is assumed that the pulse generator 102 generates ten thousand pulses per revolution, the clock pulse generator 112 generates clock pulses at a frequency 100 KHz, and the period (Ts in FIG. 7) of interrupt pulses iTP generated by the interrupt pulse generator 126 is 1 millisec. When the pulse generator 102 generates a pulse (PG2 in FIG. 7), the flip-flop 123 is set. When an interrupt pulse iTP is then generated (at a time t2 in FIG. 7, when n =0 in the equation (4) described below), the microcomputer 127 checks the value of an output Q of the flip-flop 123 to determine whether the flip-flop 123 is set or not.

Since the flip-flop 123 is set (at the time t2 when the interrupt pulse iTP is generated), the speed is computed in the same manner as described with reference to FIG. 4. The computed speed is used as an initial value $\hat{V}_{[0]}$ in the equation (4).

The count N of the counter 113 which is stored in the register 114 in FIG. 6 is read by the microcomputer 127. As the count N represents the period of pulses generated by the pulse generator, i.e., the time from PG1 to PG2 in FIG. 7, the value V derived from the equation (3) is used as a detected speed. The value of the speed is also stored as $\hat{V}_{[n-1]}$ in a register in the microcomputer 127. The flip-flop 123 is reset by the speed computation end signal RT produced.

While the flip-flop 123 is being reset, an arithmetic operation is carried out according to the equation (4) each time an interrupt pulse iTP is produced, to produce an estimated value $\hat{V}_{[n]}$ of speed.

$$\hat{V}_{[n]} = \hat{V}_{[n-1]} + \frac{K_T \cdot T_S}{J_m + J_L} I_{[n-2]} \quad (4)$$

where $K_T$ is the torque constant of the motor, $J_m$ the inertia of the motor, $J_L$ the inertia of the load, $T_S$ the sampling interval (equal to Ts in FIG. 7), $I_{[n-2]}$ the value of the current in the motor, which is the value of I at the time when the next preceding but one interrupt pulse is generated, and $\hat{V}_{[n-1]}$ the estimated speed which is the value of V at the time the next preceding interrupt pulse is generated.

When an interrupt signal iTP is generated at t3 in FIG. 7, since the flip-flop 123 has been reset, an estimated speed $\hat{V}_{[n]}$ is computed using the value of the current $I_{[n-2]}$ which is stored in a register C in the microcomputer 127 and which is the value of I at the time the next preceding but one interrupt pulse is generated, the estimated speed $\hat{V}_{[n-1]}$ which is stored in a register B in the microcomputer 127 and which is one sampled data prior to the computation, and the equation (4). The computed speed is used as a detected speed, the value of which is stored as $\hat{V}_{[n-1]}$ in the register B. The value of a current $I_{[n-1]}$ which is one sampled data prior to the computation is stored in a register D as the value of a current $I_{[n-2]}$ which is two sampled data prior to the computation.

The current in the DC motor 121 is detected by the current detector 125 and converted into a digital quantity by the analog-to-digital converter 124, and the digital value is read by the microcomputer 127 and stored as $I_{[n-1]}$ in the register C.

The speed detecting method disclosed in the above Laid-Open Publication detects the angular velocity by repeating the foregoing operation. Comparison between FIGS. 5 and 7 shows that the angular velocity detected by the method shown in FIG. 6 varies in a step-like manner at a smoother rate than that at which the angular velocity detected by the method of FIG. 4 varies.

In the above method, however, the equation (4) has no term with respect to a load torque. Since the current $I_{[n-2]}$ at the time the next preceding but one interrupt pulse is generated is required for computing the temporal estimated speed $V_{[n]}$, any difference between the estimated speed and the actual speed will be increased if the load torque is varied or the current command value is varied.

An initial value required to carry out the computation according to the equation (4) employs the value computed according to the equation (3). However, the value derived from the equation (3) is based on the method shown in FIG. 4. As described above, this value is an average speed between PG and PG in FIG. 5, for example, and hence is not an instantaneous speed at PG which should be used.

In other words, the speed detecting method employing the equation (4) uses as an initial value the value containing a difference with the actual speed. As a consequence, the lower the speed, the greater the difference between the detected speed and the actual speed, and the angular velocity is detected with a greater delay, as shown in FIG. 8. This condition is essentially the same as the incorporation of a dead time element in the speed control loop. Therefore, the gain of the speed control loop cannot be increased in low-speed rotation, and the speed control method is essentially subjected to the drawback with the method shown in FIG. 4. It is accordingly extremely difficult to effect highly accurate position detection and high-speed and highly accurate speed detection.

SUMMARY OF THE INVENTION

The present invention has been made in an attempt to eliminate the above deficiencies, and provides a novel speed detecting method for detecting, without a time delay, the actual speed of a motor when the motor rotates at a low speed.

According to one aspect of the present invention, there is provided a method of detecting the speed of a motor, the output shaft of which is connected to a pulse generator for generating pulse signals depending on the angular displacement of the motor, the method comprising the steps of:

(a) setting an initial value which is used to estimate the speed and an estimated value of the variable representing the torque disturbance both at zero, (b) estimating the speed at the time when a sampling pulse (which can be referred to as an interrupt pulse in the embodiments) is generated, by integrating the sum of the variable representing the motor torque and the estimated value of the variable representing the torque disturbance with the prior initial value as an initial value, each time the sampling pulse is generated, until the pulse generator generates a pulse signal, (c) calculating the variable representing the torque disturbance when the pulse signal is generated, by using the time period between the time step (a) is executed and the time the pulse signal is generated and the estimated values of the speed calculated at step (b) between this time period, (d) calculating the real speed at the time when the pulse signal is generated, by compensating the speed estimated just before this time, using the amount of compensation for the torque disturbance which is the difference between the variable representing the torque disturbance and the estimated value of the variable representing the torque disturbance, (e) replacing the initial value which is used to estimate the speed by the real speed calculated at step (d), and replacing the estimated value of the variable representing the torque disturbance by the prior variable representing the torque disturbance calculated at step (c), (f) estimating the speed at the time when the sampling pulse is generated, by integrating the sum of the variable representing the motor torque and the estimated value of the variable representing the torque disturbance with the initial value replaced at step (e) as an initial value, each time the sampling pulse is generated, until the pulse generator generates a pulse signal, (g) calculating the variable representing the torque disturbance when the pulse signal is generated, by using the time period between the time the preceding pulse signal is generated and the time the present pulse signal is generated and the estimated values of the speed calculated at step (f) between this time period, (h) calculating the real speed at the time when the pulse signal is generated, by compensating the speed estimated just before this time, using the amount of compensation for the torque disturbance which is the difference between the variable representing the torque disturbance and the estimated value of the variable representing the torque disturbance, (i) replacing the initial value which is used to estimate the speed by the real speed calculated at step (h), and replacing the estimated value of the variable representing torque disturbance by the prior variable representing the torque disturbance calculated at step (g), (j) estimating the speed at the time when the sampling pulse is generated, by integrating the sum of the variable representing the torque disturbance with the initial value replaced at step (i) as an initial value, each time the sampling pulse is generated, until the pulse generator generates a pulse signal, and (k) repeating steps (g)–(j).

According to another aspect of the present invention, there is provided a method of detecting the speed of a moving body driven by a motor and provided with a pulse generator for generating pulse signals depending on the displacement of the moving body, the method comprising the steps of:

(a) setting an initial value which is used to estimate the speed and an estimated value of the variable representing the torque disturbance both at zero, (b) estimating the speed at the time when a sampling pulse is generated, by integrating the sum of the variable representing the motor torque and the estimated value of the variable representing the torque disturbance with the prior initial value as an initial value, each time the sampling pulse is generated, until the pulse generator generates a pulse signal, (c) calculating the variable representing the torque disturbance when the pulse signal is generated, by using the time period between the time step (a) is executed and the time the pulse signal is generated and the estimated values of the speed calculated at step (b) between this time period, (d) calculating the real speed at the time when the pulse signal is generated, by compensating the speed estimated just before this time, using the amount of compensation for the torque disturbance which is the difference between the variable representing the torque disturbance and the estimated variable torque disturbance, (e) replacing the initial value which is used to estimate the speed by the real speed calculated at step (d), and replacing the estimated value of the variable representing the torque disturbance by the prior variable representing the torque disturbance calculated at step (c), (f) estimating the speed at the time when the sampling pulse is generated, by integrating the sum of the variable representing the motor torque and the estimated value of the variable representing the torque disturbance with the initial value replaced at step (e) as an initial value, each time the sampling pulse is generated, until the pulse generator generates a pulse signal, (g) calculating the variable representing the torque disturbance when the pulse signal is generated, by using the time period between the time preceding pulse signal is generated and the time the present pulse signal is generated and the estimated values of the speed calculated at step (f) between this time period, (h) calculating the real speed at the time when the pulse signal is generated, by compensated the speed estimated just before this time, using the amount of compensation for the torque disturbance which is the difference between the variable representing the torque disturbance and the estimated value of the variable representing the torque disturbance, (i) replacing the initial value which is used to estimate the speed by the real speed calculated at step (h), and replacing the estimated value of the variable representing the torque disturbance calculated at step (g), (j) estimating the speed at the time when the sampling pulse is generated, by integrating the sum of the variable representing the torque disturbance with the initial value replaced at step (i) as an initial value, each time the sampling pulse is generated, until the pulse generator generates a pulse signal, and (k) repeating steps (g)–(j).

According to still another aspect of the present invention, there is provided a method of detecting the speed of a linear motor provided with a pulse generator for generating pulse signals depending on the displacement of the moving body, the method comprising the steps of:

(a) setting the initial value which is used to estimate the speed and an estimated value of the variable representing the thrust disturbance both at zero, (b) estimating the speed at the time when a sampling pulse is generated, by integrating the sum of the variable representing the motor thrust and the estimated value of the variable representing the thrust disturbance with the prior initial value as an initial value, each time a sampling pulse is generated, until the pulse generator generates a pulse signal, (c) calculating the variable representing the thrust disturbance when the pulse signal is generated, by using the time period between the time step (a) is executed and the time the pulse signal is generated and the estimated values of the speed calculated at step (b) between this time period.

(d) calculating the real speed at this time when the pulse signal is generated, by compensating the speed estimated just before this time, using the amount of compensation for the thrust disturbance which is the difference between the variable representing the thrust disturbance and the estimated value of the variable representing the thrust disturbance, (e) replacing the initial value which is used to estimate the speed by the real speed calculated at step (d), and replacing the estimated value of the variable representing the thrust disturbance by the prior variable representing the thrust disturbance calculated at step (c).

(f) estimating the speed at the time when the sampling pulse is generated by integrating the sum of the variable representing the motor thrust and the estimated value of the variable representing the thrust disturbance with the initial value replaced at step (e) as an initial value, each time the sampling pulse is generated, until the pulse generator generates a pulse signal, (g) calculating the variable representing the thrust disturbance when the pulse signal is generated, by using the time period between the time the preceding signal is generated and the time the present pulse signal is generated and the estimated values of the speed calculated at step (f) between this time period, (h) calculating the real speed at the time when the pulse signal is generated, by compensating the speed estimated just before this time, using the amount of compensation for the thrust disturbance which is the difference between the variable representing the thrust disturbance and the estimated value of the variable representing the thrust disturbance, (i) replacing the initial value which is used to estimate the speed by the real speed calculated at step (h), and replacing the estimated value of the variable representing the thrust disturbance by the prior variable representing the thrust disturbance calculated at step (g), (j) estimating the speed at the time when the sampling pulse is generated, by integrating the sum of the variable representing the motor thrust and the estimated value of the variable representing the thrust disturbance with the initial value replaced at step (i) as an initial value, each time sampling pulse is generated, until the pulse generator generates a pulse signal, and (k) repeating the steps (g)–(j).

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

Figure 1:
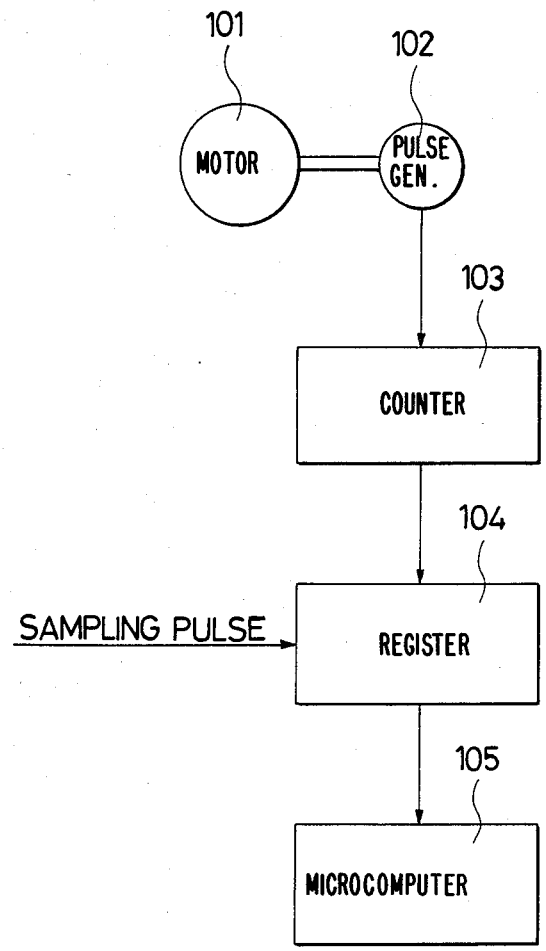
FIG. 1 is a prior art block diagram of a conventional device for detecting the speed of a motor.
Figure 2A:
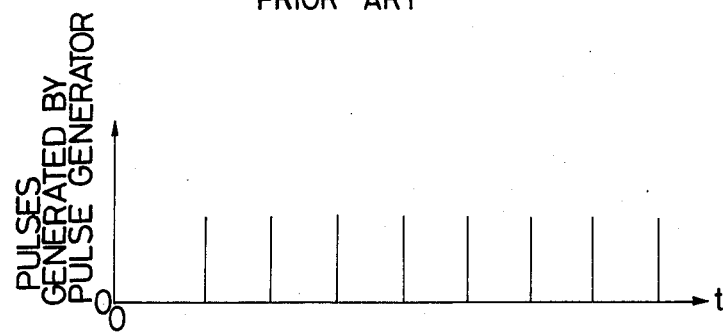
FIGS. 2(a), 2(b), 3(a), 3(b) and 3(c) are prior art diagrams showing methods of detecting the speed with the device of FIG. 1.
Figure 2B:
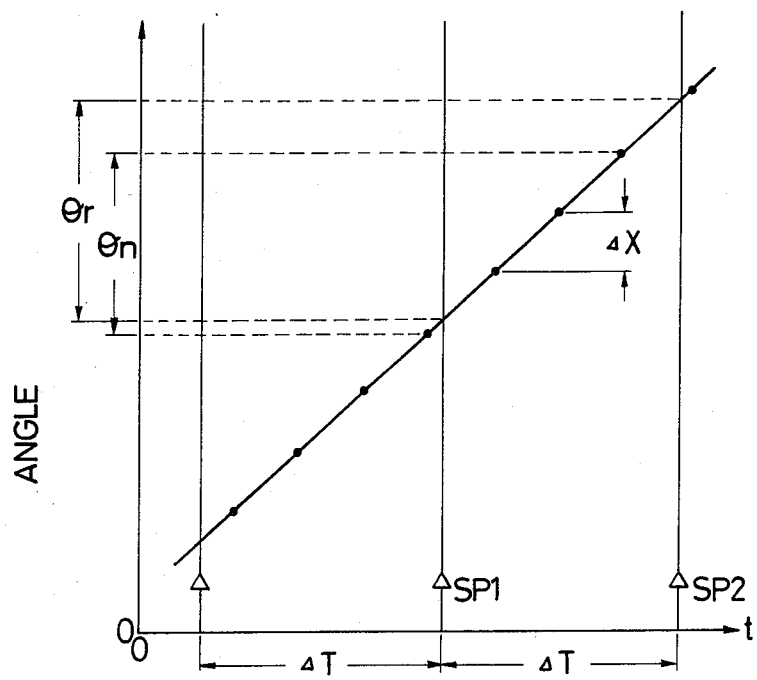
Figure 3A:
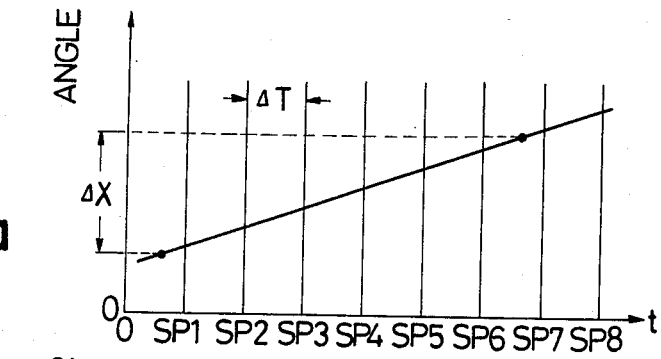
Figure 3B:
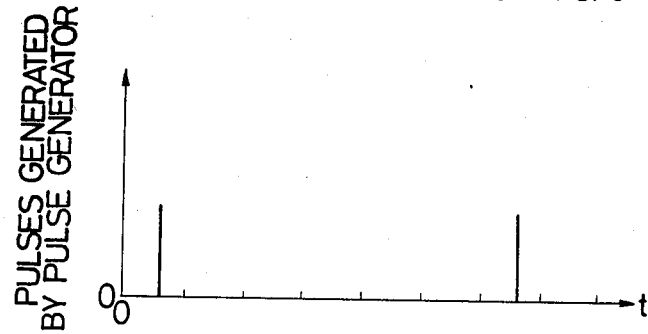
Figure 3C:
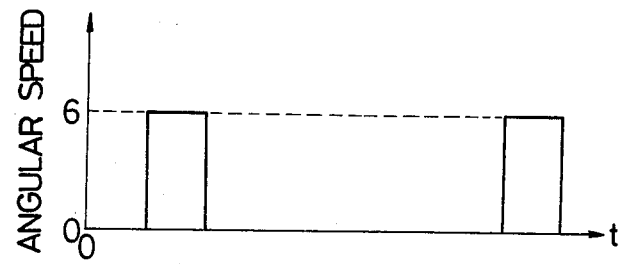
Figure 4:
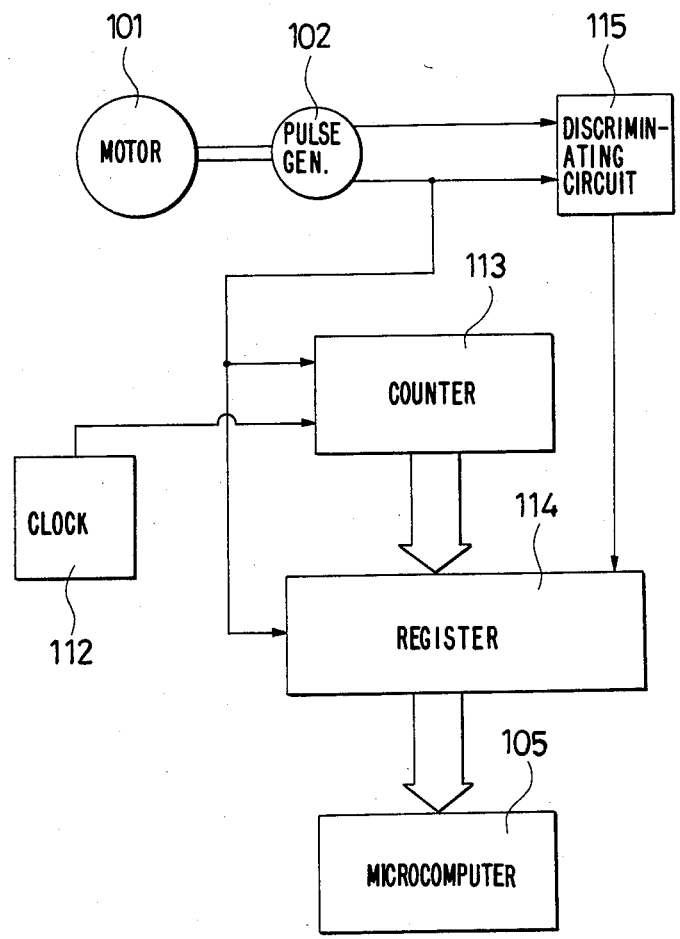
FIG. 4 is a prior art block diagram of another conventional device for detecting the speed of a motor.
Figure 5A:
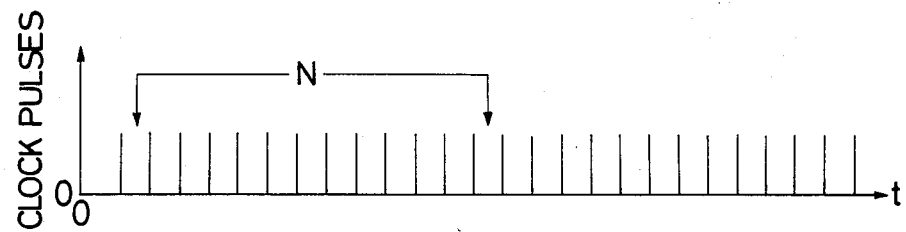
FIGS. 5(a), 5(b) and 5(c) are prior art diagrams illustrating a method of detecting the speed with the device of FIG. 4.
Figure 5B:
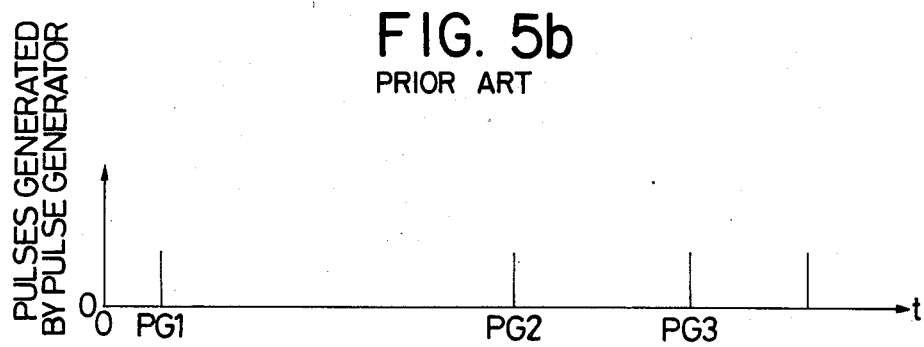
Figure 5C:
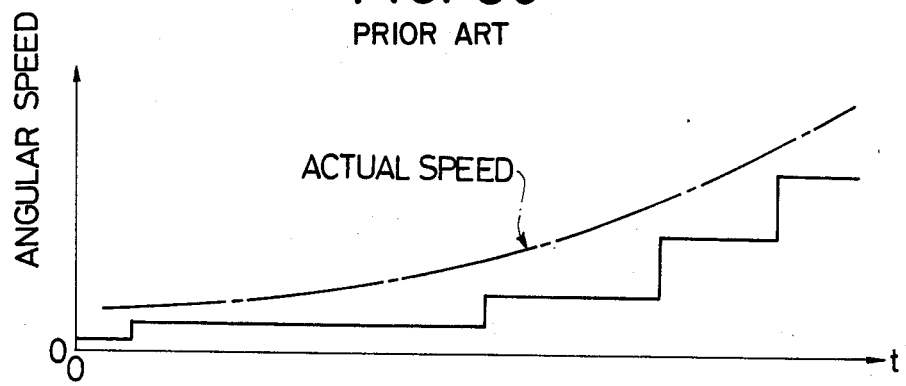
Figure 6:
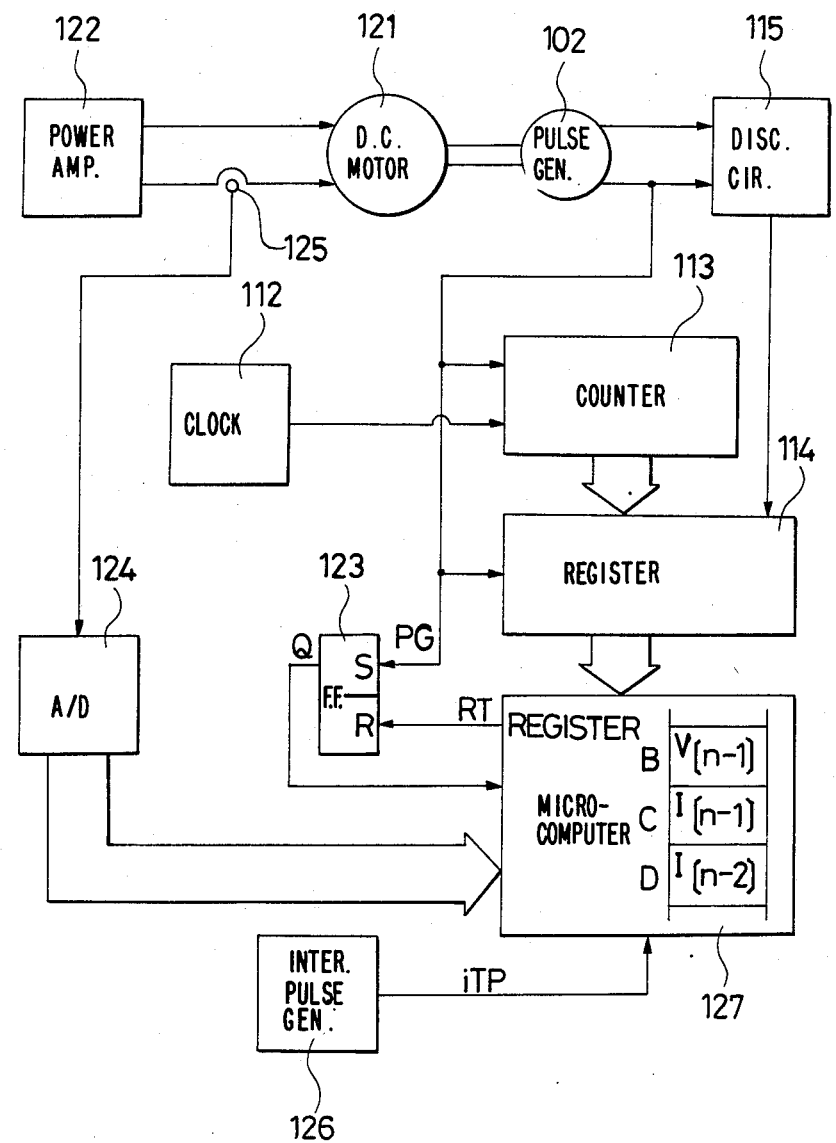
FIG. 6 is a prior art block diagram of still another conventional device for detecting the speed of a motor.
Figure 7A:
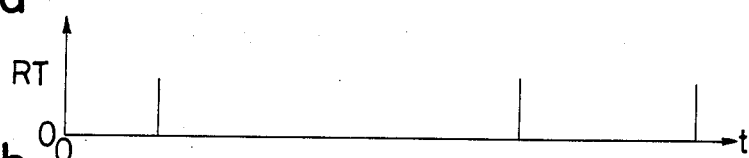
Figure 7B:
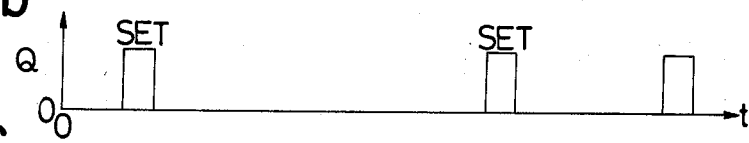
Figure 7C:
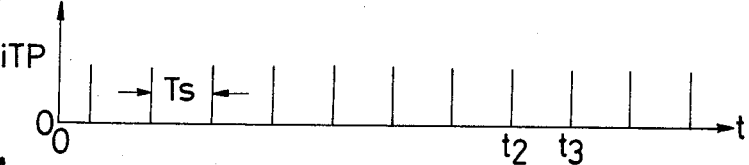
Figure 7D:
Figure 7E:
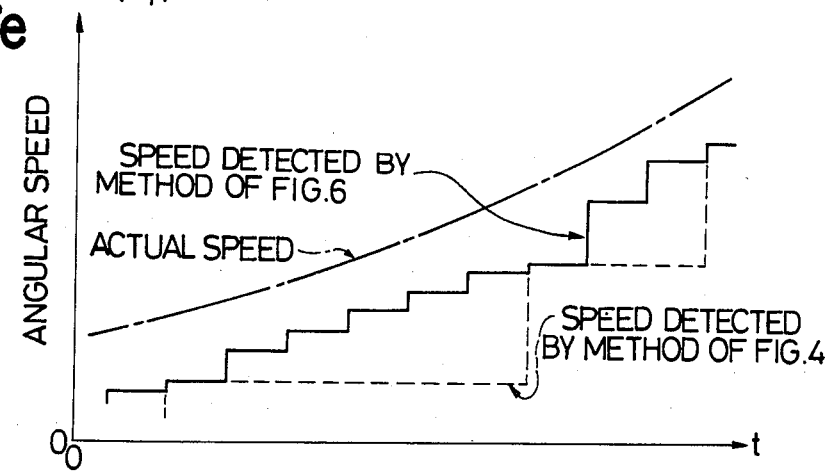
Figure 8A:
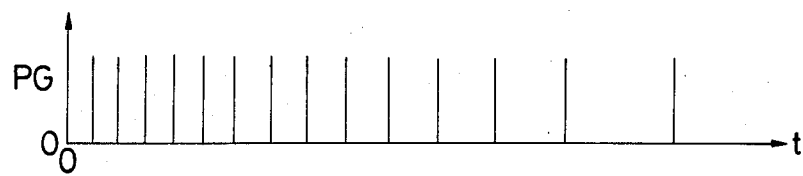
Figure 8B:
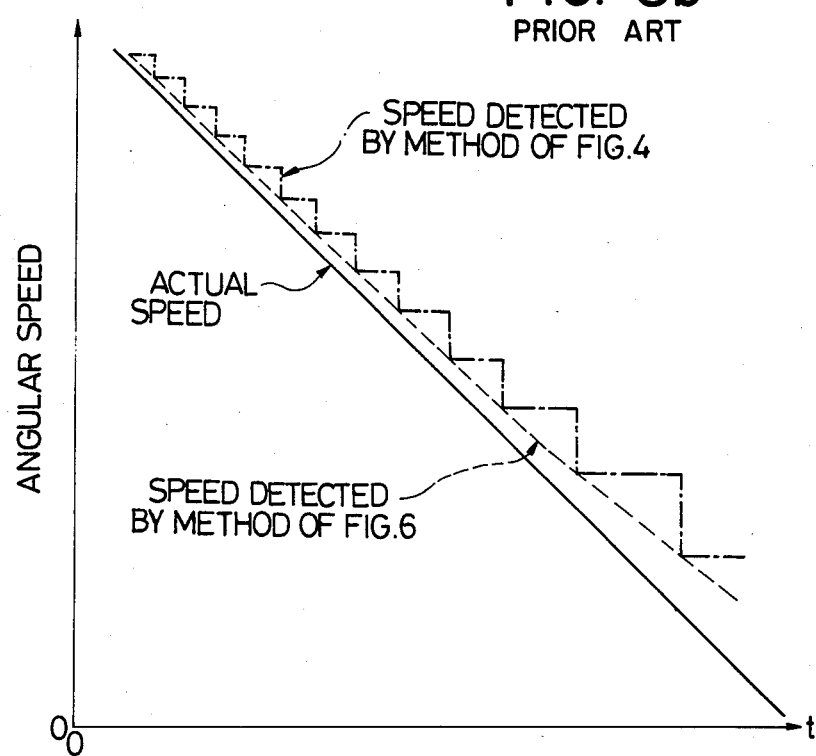
Figure 10:
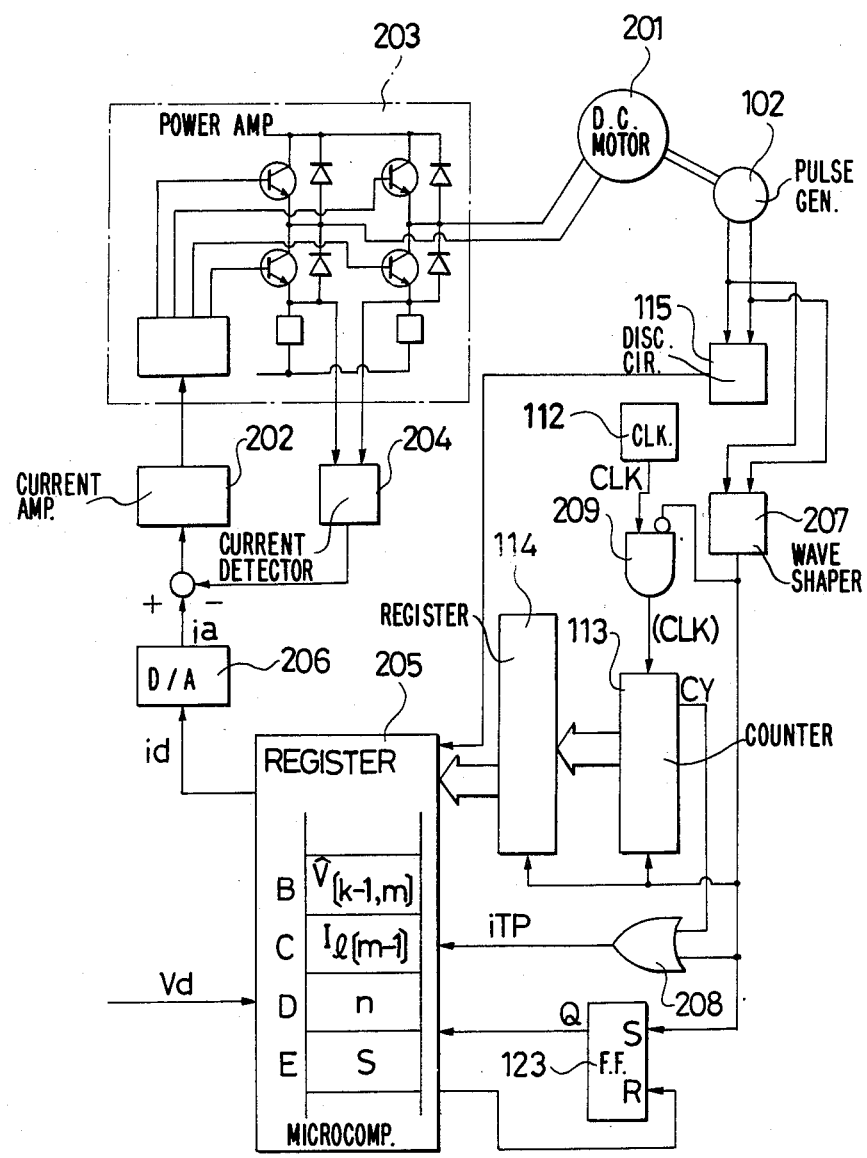
Figure 11:
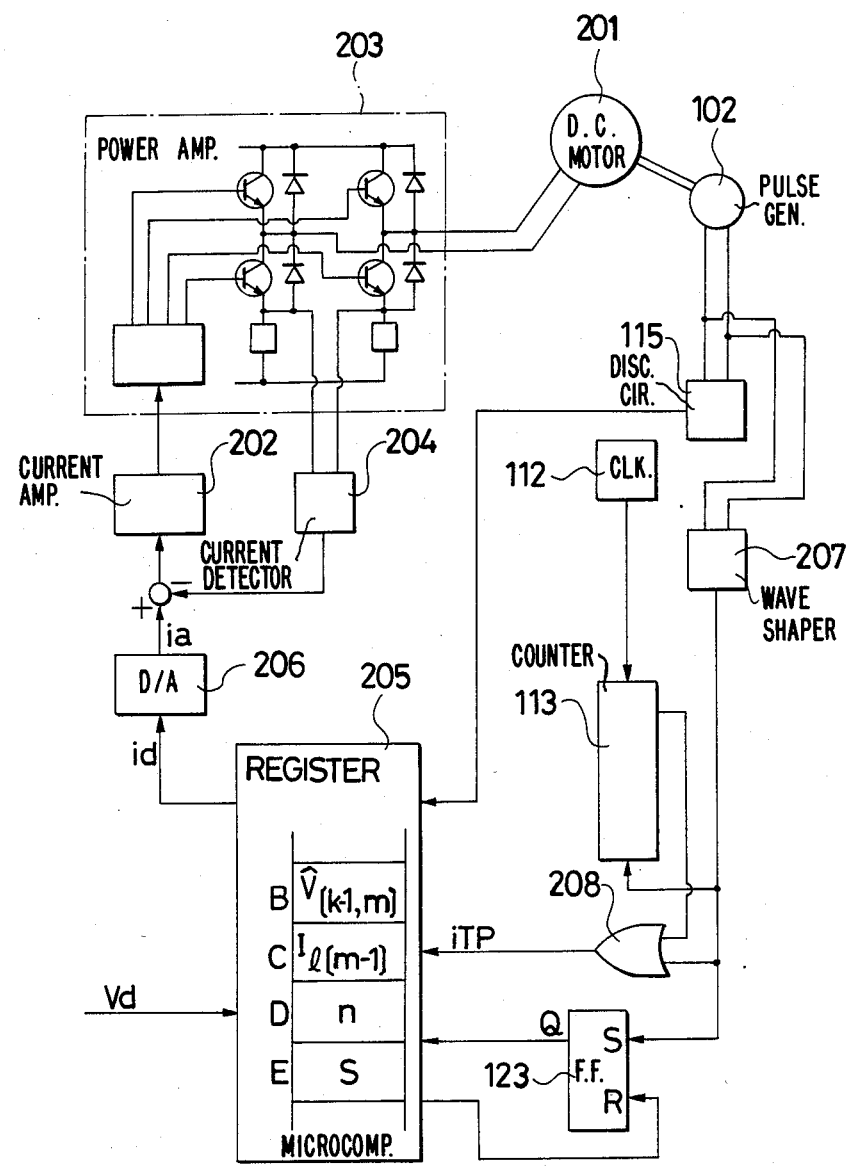

7(a), 7(b), 7(c), 7(d), 7(e), 8(a), 8(b), 9(a), 9(b), 9(c) and 9(d) are prior art diagrams illustrating a method of detecting the speed with the device of FIG. 6;

FIG. 10 is a block diagram of an embodiment according to the present invention;

FIG. 11 is a block diagram of another embodiment of the present invention; and

Figure 12A:
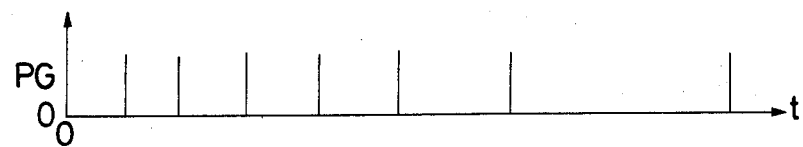
Figure 12B:
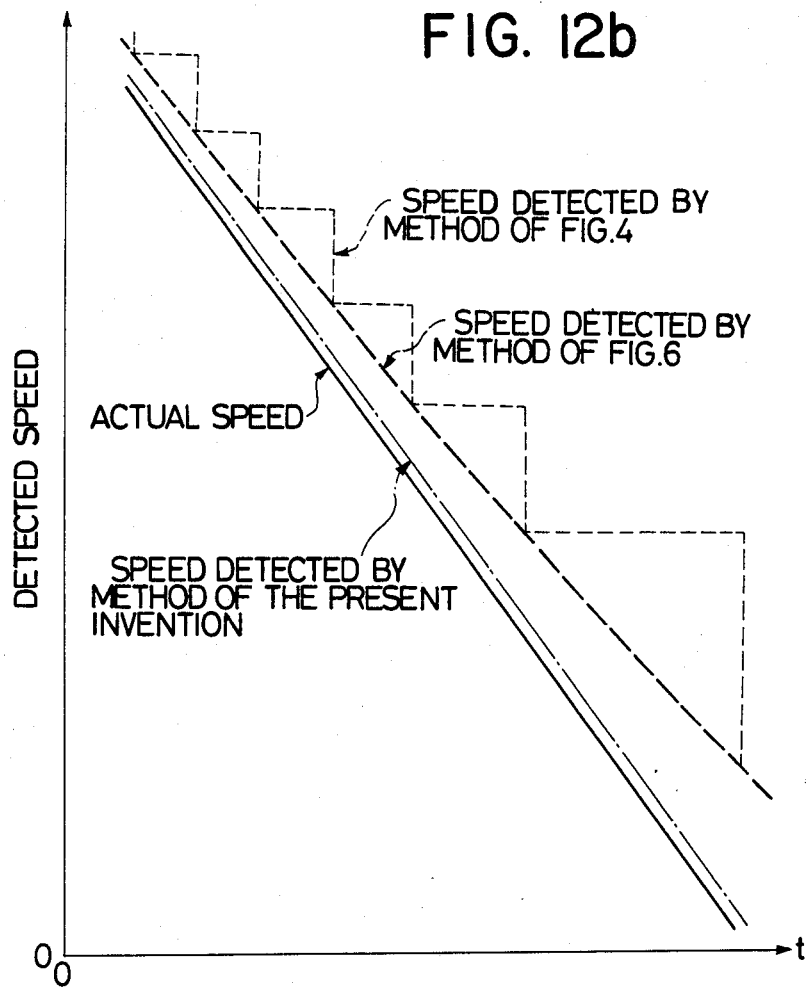

FIGS. 12(a) and 12(b) are diagrams showing the advantages of the method of the invention.

DESCRIPTION OF THE PREFERRED EMBODIMENTS

The principles of the present invention is described as follows.

Since a pulse generator for generating pulses dependent on the rotational angle of a motor or the position of a moving body driven by the motor is essentially a position detector, the pulse generator produces information representative of a position and a time required for the moving body to move over a given distance.

The conventional methods have regarded the average speed computed from the position and the time as the actual speed. According to the present invention, attention is drawn to the fact that the above two items of information, i.e., position and time, can accurately be measured individually to produce highly accurate values thereof.

The equations for computing the actual speed will here-in-after be described with reference to a DC motor as an example.

Figure 9A:
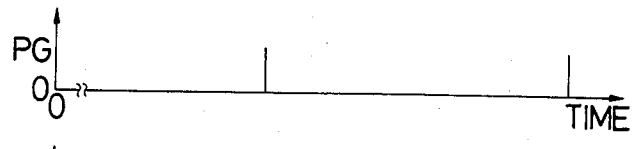
Figure 9B:
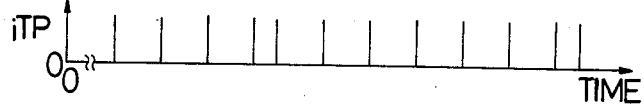
Figure 9C:
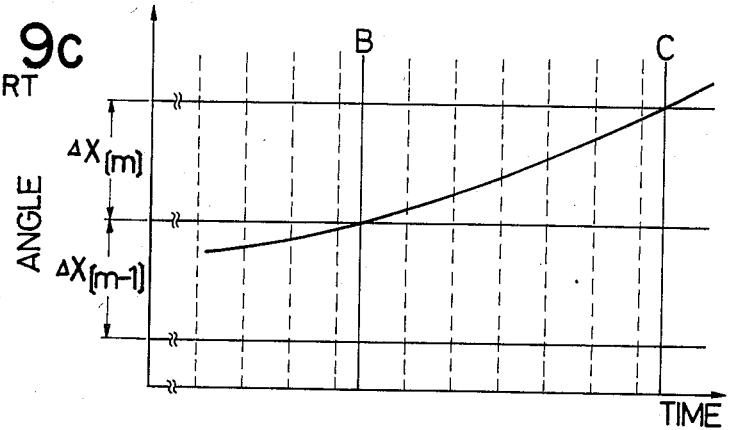
Figure 9D:
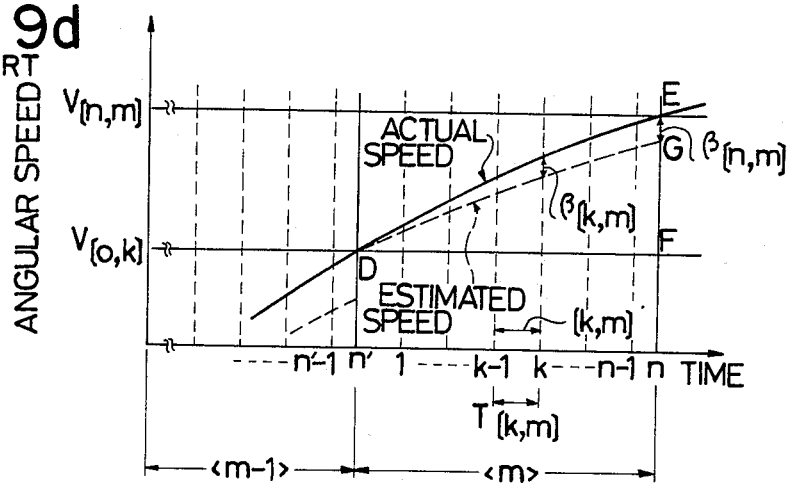

Symbols employed in the following description are defined as follows:

$<m>$: the interval between the (m−1)th pulse and the mth pulse generated by a pulse generator as shown in FIG. 9(c) and 9(d);

[k, m]: the kth interval in the interval $<m>$ as shown in FIG. 9(c) and 9(d);

n': the time when the final interrupt pulse is generated in the interval $<m-1>$ as shown in FIG. 9(d);

n: the time when the final interrupt pulse is generated in the interval $<m>$ as shown in FIG. 9(d);

τm: the torque generated by the motor;

τl: the torque disturbance against the motor torque;

τ: the torque given to the load of the motor;

Jm: the inertia of the motor;

Jl: the inertia of the motor load;

J: the sum of the inertia of the motor and the inertia of the motor load;

φ: the field magnetic flux of the motor;

I: the armature current of the motor;

Kt: the torque constant of the motor;

$V_{[k, m]}$: the speed at the time the kth interrupt pulse is generated in the interval $<m>$;

$I_{[k, m]}$: the motor current at the time the kth interrupt pulse is generated in the interval $<m>$;

$\hat{V}_{[k, m]}$: the estimated speed at the time the kth interrupt pulse is generated in the interval $<m>$;

$I_{l[m]}$: the value of the current converted from the disturbance in the interval $<m>$;

$T_{[k, m]}$: the time between the (k−1)th interrupt pulse and the kth interrupt pulse in the interval $<m>$;

$\beta_{[k, m]}$: the error for the speed at the time when the kth interrupt pulse is generated in the interval $<m>$;

$\gamma_{[m]}$: the amount of compensation for the disturbance in the interval $<m>$;

$\Delta X_{[k, m]}$: the distance advanced in the interval [k, m];

$\Delta X_{[m]}$: the distance advanced in the interval [m].

The variable $\Delta X$ may be either the advanced distance or the angular velocity, but is herein limited to the advanced distance for illustrative purpose.

Assuming that the field flux is given as φ and the armature current as I, the torque τm of the DC motor is given by:

$$\tau m = KI\phi \quad (5)$$

where K is a constant. Therefore, with the field flux φ being constant, the torque is proportional to the armature current as indicated by the following equation:

$$\tau m = KtI \quad (6)$$

where Kt is a constant. Given the torque disturbance against the motor torque, the torque τ imposed on the load is expressed by:

$$\tau = \tau m + \tau l \quad (7)$$

The angle (position) at the time the motor rotates at a low speed is varied as shown in FIG. 9(c).

B and C in FIG. 9(a) to 9(d) denote times when the pulse generator produces pulses. Intervals between the pulses are expressed by $<m>$. The broken lines are indicative of times when interrupt pulses are generated. The interval between the kth pulse and the (k−1)th interrupt pulse is expressed by [k, m], and the time between these interrupt pulses is expressed by $T_{[k, m]}$.

It is assumed that the rotational angle per pulse of the pulse generator is expressed by $\Delta X_{[m]}$, the inertia of the motor by Jm, the inertia of the load by Jl, and the torque constant by Kt.

Assuming that the current of the motor in the interval [k, m] is $I_{[k, m]}$, and the disturbance as converted into a current is $I_{l[m]}$ on the condition that the disturbance torque in the interval $<m>$ is constant, the speed $V_{[k, m]}$ in the interval [k, m] is expressed by:

$$V_{[k,m]} = \frac{1}{J_m + J_L} \int \tau dt + V_{[k-1,m]} \quad (8)$$

$$= \frac{Kt}{J_m + J_L} \int (I_{[k,m]} + I_{l[m]}) dt + V_{[k-1,m]}$$

$$= \frac{Kt}{J} (I_{[k,m]} + I_{l[m]}) T_{[k,m]} + V_{[k-1,m]}$$

where $J = J_m + J_L$.

The equation (8) represents the actual speed in the interval [k, m]. Since the disturbance $I_{l[m]}$ is unknown in the interval $<m>$, a disturbance $I_{l[m-1]}$ in the interval $<m-1>$ is used to determine the estimated speed $\hat{V}_{[k, m]}$ in the interval [k, m] according to the following equation (assuming that the disturbance in the interval $<m>$ is the same as the disturbance the interval $<m-1>$):

$$\hat{V}_{[k,m]} = \frac{K}{J} (I_{[k,m]} + I_{l[m-1]}) T_{[k,m]} + \hat{V}_{[k-1,m]} \quad (9)$$

If a recurrence formula for determining $I_{l[m]}$, using $I_{l[m-1]}$, at the end of the interval $<m>$ or when a pulse is produced by the pulse generator, can be derived then $I_{l[m]}$ can be computed in the next interval $<m+1>$ according to such a recurrence formula. Therefore, if a recurrence formula for determining $I_{l[m]}$ at the end of the interval $<m>$ is derived, $I_{l[m-1]}$ in the equation (9) has already been known in the interval $<m>$ according to such a recurrence formula.

The method of deriving such a recurrence formula is explained as follows:

First, $\beta_{[k, m]}$ and $\gamma_{[m]}$ are defined as follows:

$$\beta_{[k, m]} \equiv V_{[k, m]} - \hat{V}_{[k, m]} \quad (10)$$

$$\gamma_{[m]} \equiv I_{l[m]} - I_{l[m-1]} \quad (11)$$

$\beta_{[k, m]}$ defined by the above equation (10) is representative of an error produced by employing the estimated speed rather than the actual speed, which should be employed, as shown in FIG. 9(d).

$\gamma_{[m]}$ defined by the above equation (11) is representative of an error produced by employing the disturbance $I_{l[m-1]}$ determined in the interval $<m-1>$, which is one prior to the computation, rather than the disturbance $I_{l[m]}$. Although in the equation 11 $\gamma_{[m]}$ indicates the difference between the disturbances in the intervals $<m>$ and $<m-1>$, $\gamma_{[m]}$ can generally be defined as a desired combination of past disturbances.

Now, the relationship between $\beta_{[k, m]}$ and $\gamma_{[m]}$ is determined. From the equation (8), $$V_{[k,m]} = \frac{Kt}{J} (I_{[k,m]} + I_{l[m-1]}) T_{[k,m]} + \hat{V}_{[k-1,m]} + \quad (12)$$

$$(V_{[k-1,m]} - \hat{V}_{[k-1,m]}) + \frac{Kt}{J}(I_{l[m]} - I_{l[m-1]})T_{[k,m]}$$

From the equations (11) and (9), the equation (12) becomes:

$$(V_{[k,m]} - \hat{V}_{[k,m]}) = (V_{[k-1,m]} - \hat{V}_{[k-1,m]}) + \frac{Kt}{J}T_{[k,m]}\gamma_{[m]} \quad (13)$$

Putting the equation (10) in the equation (13), $$\beta_{[k,m]} = \beta_{[k-1,m]} + \frac{Kt}{J}T_{[k,m]}\gamma_{[m]} \quad (14)$$

By solving the recurrence formula (14), $$\beta_{[k,m]} = \beta_{[0,m]} + \frac{Kt}{J}\gamma_{[m]}\sum_{i=1}^{k}T_{[i,m]} \quad (15)$$

At this time, the speed of the motor is zero as the motor is initially stopped. There is therefore no difference with the actual speed since the initial value of the estimated speed is set to zero at this time. Accordingly, the error of the initial value of the estimated speed in the initial interval <1> is $\beta_{[0,2]}=0$. Since the error produced by the computation in the interval <1> is compensated for by the amount of compensation [1] as described below, the error of the initial value in the next interval <2> is also $\beta_{[0,2]}=0$. In general, therefore, the error of the initial value of the estimated value in any interval <m> is $\beta_{[0,m]}=0$.

Accordingly, $\beta_{[k,m]}$ is given by the following equation:

$$\beta_{[k,m]} = \frac{Kt}{J}\gamma_{[m]}\sum_{i=1}^{k}T_{[i,m]} \quad (16)$$

From the equations (10) and (16), the actual speed $V_{[k,m]}$ in the interval [k, m] can be expressed by the following equation, using the estimated speed $\hat{V}_{[k,m]}$ and $\gamma_{[m]}$:

$$V_{[k,m]} = \hat{V}_{[k,m]} + \frac{Kt}{J}\gamma_{[m]}\sum_{i=1}^{k}T_{[i,m]} \quad (17)$$

The distance $\Delta X_{[k,m]}$ advanced in the interval [k, m] is determined as follows:

$$\Delta X_{[k,m]} = \frac{V_{[k-1,m]} + V_{[k,m]}}{2}T_{[k,m]} \quad (18)$$

By putting the equation (17) into the equation (18), $$\Delta X_{[k,m]} = \frac{T_{[k,m]}}{2}\left\{(\hat{V}_{[k,m]} + \hat{V}_{[k-1,m]}) + \frac{Kt}{J}\gamma_{[m]}\left(2\sum_{i=1}^{k-1}T_{[i,m]} + T_{[k,m]}\right)\right\} \quad (19)$$

From the equation (19), the distance advanced in the interval <m> is given by:

$$\Delta X_{[m]} = \sum_{k=1}^{n}\Delta X_{[k,m]} = \sum_{k=1}^{n}\frac{T_{[k,m]}}{2}(\hat{V}_{[k,m]} + \hat{V}_{[k-1,m]}) + \quad (20)$$

$$\frac{Kt}{J}\gamma_{[m]}\sum_{k=1}^{n}\frac{T_{[k,m]}}{2}\left(2\sum_{j=1}^{k-1}T_{[j,m]} + T_{[k,m]}\right)$$

From the equation (20), $$\gamma_{[m]} = \frac{\Delta X_{[m]} - \sum_{k=1}^{n}\frac{T_{[k,m]}}{2}(\hat{V}_{[k,m]} + \hat{V}_{[k-1,m]})}{\frac{Kt}{J}\sum_{k=1}^{n}\frac{T_{[k,m]}}{2}\left(2\sum_{j=1}^{k-1}T_{[j,m]} + T_{[k,m]}\right)} \quad (21)$$

$\Delta X_{[m]}$ in the equation (20) indicates the area DEF in FIG. 9(c), while the first term on the righthand side of the equation (20) indicates the area DFG and the second term the area DEG. The area DEF represents the actual distance advanced in the interval <m>, which is equal to the distance $\Delta X_{[m]}$ advanced between each pulse of the pulse generator. Although this distance may be constant or not, it depends on the construction of the pulse generator itself and hence is known.

The area DFG is indicative of the distance advanced in the interval <m>, by employing the estimated speed $\hat{V}_{[k,m]}$ instead of the actual speed $V_{[k,m]}$. If the estimated speed coincides with the actual speed, then the area DFG coincides with the area DEF. If the disturbance $I_{l[m]}$ in the interval <m> is known at the time of computing the estimated speed $\hat{V}_{[k,m]}$, the estimated speed coincides with the actual speed. Since only the disturbance $I_{l[m-1]}$ is known here in the interval <m-1>, the area DEF does not generally coincide with the area DFG. Therefore, the area DEG which is the difference between the area DEF and DFG is produced by employing the disturbance $I_{l[m-1]}$ rather than the disturbance $I_{l[m]}$ which should be employed.

The equation (20) means that the area DFE is the sum of the area DFG and the area DEG. Since the area DFE is known and the area DFG is determined by employing the estimated speed $\hat{V}_{[k,m]}$ computed at the end point C in the final interval [n, m] of the interval <m>, $\gamma_{[m]}$ can be determined by effecting the computation given by the equation (21) which is a modification of the equation (20) at the time C.

Accordingly, $I_{l[m]}$ can be determined, based on the equation (11), by:

$$I_{l[m]} = \gamma_{[m]} + I_{l[m-1]} \quad (22)$$

Since $\gamma_{[m]}$ can be determined in the final interval [n, m] in the interval <m>, an actual speed $V_{[n,m]}$ is determined according to the following equation by using $\gamma_{[m]}$ in the equation (17):

$$V_{[n,m]} = \hat{V}_{[n,m]} + \frac{Kt}{J}\gamma_{[m]}\sum_{k=1}^{n}T_{[k,m]} \quad (23)$$

The first term on the righthand side of the equation (23) represents the speed at point G in FIG. 9(d), and the second term GE in FIG. 9(d), i.e., the speed error $\beta_{[n,m]}$ in the interval [n, m].

As described above, when a pulse is generated by the pulse generator at the end of the interval <m>, the amount of compensation $\gamma_{[m]}$ for the disturbance is computed according to the equation (21) since $\hat{V}_{[k,m]}$, $T_{[k,m]}$, $\Delta X_{[m]}$ are known, and the disturbance $I_{l[m]}$ in the interval <m> is computed according to the equation (22). As $\gamma_{[m]}$ is determined, the actual speed $V_{[n,m]}$ in the interval [n, m] is found according to the equation (23).

When no pulse is generated by the pulse generator in the interval $<m>$, the current $I_{[k, m]}$ of the motor is determined each time an interrupt pulse is generated, and the speed $V_{[k, m]}$ is estimated according to the equation (9) by using the disturbance $I_{l[m-1]}$ found in the previous interval $<m-1>$. The estimated speed is used as the detected speed. The foregoing is the principle of the present invention.

While the equations have been described for estimating the actual speed with reference to a DC motor by way of example, the equations (8) through (23) are not limited to a DC motor, but may be applied to other motors.

A method in which the present invention is applied to the other type motors will be described below.

A certain quantity kept in proportion to the torque m produced by the motor is measured as the variable I in the equation (6), or for a control system such for example as for vector control in which a torque and a torque command are proportional to each other, the torque command is used as the variable I in the equation (6). Then, the relationship of the equation (6) is established between the variable I and the torque $\tau m$. Therefore, the equations (8) through (23) can directly be used. Where a quantity proportional to the torque $\tau m$ of the motor cannot be employed, the equations (8) through (23) can also directly be used if quantities $\alpha_1, \alpha_2, \alpha_3, \ldots$ which are related to the torque $\tau m$ as a one-valued function can be used. The torque and these quantities are related as indicated by the following equation:

$$\tau m = f(\alpha_1, \alpha_2, \alpha_3, \ldots) \tag{24}$$

where f indicates a function.

Therefore, by expressing I as:

$$I = \frac{1}{Kt} f(\alpha_1, \alpha_2, \alpha_3, \ldots) \tag{25}$$

the same relationship as that of the equation (6) can be established.

Accordingly, the equations (8) through (23) can be applied by computing I according to the equation (25) each time $\alpha_1, \alpha_2, \alpha_3, \ldots$ are measured.

The present invention is described with reference to an embodiment in which the principles are applied to a DC motor.

As is evident from the equations (9), (21), and (23), the time interval $T_{[k, m]}$ between interrupt pulses in the interval $<m>$ is not required to be constant. However, the interval $T_{[k, m]}$ will be assumed to be of a constant value $\Delta T$ for the sake of brevity in the following embodiment. The time interval $T_{[n, m]}$ in the interval [n, m] is however not constant inasmuch as the timing at which the pulse generator generates pulses is not constant. Therefore, $$T_{[k, m]} = \Delta T \tag{26}$$

where $1 \leq k \leq n - 1$

Provided the angle (or position) per pulse generated by the pulse generator is of a constant value X, $$\Delta X_{[m]} = \Delta X \tag{27}$$

Putting the equations (26), (27) into the equations (9), (23), and (21), $$\hat{V}_{[k,m]} = \frac{Kt}{J} \Delta T(I_{[k,m]} + I_{l[m-1]}) + \hat{V}_{[k-1,m]} \tag{28}$$

where $1 \leq k \leq n - 1$.

$$\hat{V}_{[n,m]} = \frac{Kt}{J} T(I_{[n,m]} + I_{l[m-1]}) \left(\frac{T_{[n,m]}}{\Delta T}\right) + \hat{V}_{[n-1,m]} \tag{29}$$

$$V_{[n,m]} = \hat{V}_{[n,m]} + \frac{Kt}{J} \Delta T \gamma_{[m]} \left\{ (n-1) + \left(\frac{T_{[n,m]}}{\Delta T}\right) \right\} \tag{30}$$

$$\gamma_{[m]} = \frac{\frac{\Delta X}{\Delta T} - \sum_{k=1}^{n-1} \frac{1}{2} (\hat{V}_{[k,m]} + \hat{V}_{[k-1,m]}) - \left(\frac{T_{[n,m]}}{\Delta T}\right) \frac{1}{2} (\hat{V}_{[n,m]} + \hat{V}_{[n-1,m]})}{\frac{Kt}{J} \cdot \frac{\Delta T}{2} \left\{ (n-1)^2 + 2(n-1)\left(\frac{T_{[n,m]}}{\Delta T}\right) + \left(\frac{T_{[n,m]}}{\Delta T}\right)^2 \right\}} \tag{31}$$

A speed can be detected by using the above equations (22), (28) through (31). More specifically, when no pulse is generated by the pulse generator, the estimated speed $\hat{V}_{[k, m]}$ is computed according to the equation (28) each time an interrupt pulse is produced and used as the detected speed. When the pulse generator generates a pulse, an amount of compensation $\gamma_{[m]}$ is computed according to the equation (31), and a disturbance $I_{l[m]}$ is computed according to the computed $\gamma_{[m]}$ and the equation (22). The speed $V_{[n, m]}$ is computed by putting $\gamma_{[m]}$ in the equations (29), (30) and used as the detected speed. However, the speed $V_{[n, m]}$ is set at the initial value $V_{[1, 0]} = 0$ because the motor is first stopped. The disturbance $Il_{[m]}$ is set at zero because said disturbance cannot be computed until the pulse generator generates a pulse.

FIG. 10 is a block diagram of an arrangement for effecting the method of the above embodiment. Designated at 102 is a pulse generator coupled to a DC motor 201, 202 a current amplifier, 203 a power amplifier, 204 a current detector for the DC motor 201, and 205 a microcomputer.

The difference derived by subtracting the current detected by the current detector 204 from the analog current command ia issued from the microcomputer 205 through an digital-to-analog converter 206, is amplified by the current amplifier 202. The amplified signal is applied to the power amplifier 203 which drives the DC motor 102.

Because of the current feedback loop, the current of the motor is proportional to the analog current command ia.

The illustrated arrangement produces an analog current command by applying a digital current command id to the digital-to-analog converter 206. Therefore, the current of the motor can be determined by employing the digital current command.

A counter 113 counts clock pulses CLK generated by a clock pulse generator 112. When the count of the counter 113 reaches a prescribed value, the counter 113 issues a carry pulse CY and is reset to an initial condition to start counting clock pulses CLK again. This carry pulse is one example of a time-measuring pulse.

As the pulse generator 102 generates pulses upon rotation of the motor 201, a direction discriminating circuit 115 detects the direction of rotation of the motor and applies a signal indicative of the determined direction to the microcomputer 205.

A pulse generated by the pulse generator 102 is shaped in waveform by a wave shaping circuit 207, and then applied to an OR gate 208. The pulse sets a flip-flop 123 and closes an AND gate 209 to inhibit the clock pulses CLK to thereby stop the counting by the counter 113.

At this time, the counted value of the counter 113 is stored in the register 114 and the counter 113 is cleared or reset to an initial value. Immediately thereafter, the AND gate 209 is opened to apply the clock pulses CLK to the counter 113 which starts counting the pulses again.

The carry pulse CY from the counter 113 and the pulse from the pulse generator 102 are passed through the OR gate 208, which applies interrupt pulses iTP to the microcomputer 205.

When a digital speed command Vd is fed to the microcomputer 205, the microcomputer 205 effects arithmetic operations according to a prescribed control algorithm to issue a digital current command id.

The motor 201 is rotated by the current command. When the pulse generator 102 produces a pulse, the initial speed $V_{[n', m-1]} = \hat{V}_{[0, m]}$ and a disturbance $I_{l[m-1]}$ are determined according to the equations (22), (29), and (30). The speed $\hat{V}_{[0, m]}$ is stored as $\hat{V}_{[k-1, m]}$ in a register B in the microcomputer 205, and the disturbance $I_{l[m-1]}$ is stored in a register C. The value n in a register D and the value S in a register E are reset to zero, and the flip-flop 123 is reset. The values of registers B-E are all reset at zero when the microcomputer 205 is first initialized.

Then, when the counter 113 counts pulses up to a prescribed value and generates a carry pulse CY, this carry pulse CY is fed to the OR gate 208 to generate an interrupt pulse iTP for putting the microcomputer 205 into an interrupt routine. At this time, the microcomputer 205 ascertains whether the flip-flop 123 has been set or not.

Since the flip-flop 123 has now been reset, the digital current command id is read as $I_{[n, m]}$, and $\hat{V}_{[k-1, m]}$ and $I_{l[m-1]}$ are read from the registers B, C in the microcomputer 205 to effect the arithmetic operation of the equation (28). The estimated speed $V_{[k, m]}$ is regarded as a detected speed.

The arithmetic operation indicated by the following equation (32) is carried out based on the speed $\hat{V}_{[k, m]}$, the value $V_{[k-1, m]}$ stored in the register B and the value S stored in the register E, and the result of the arithmetic operation is stored as new S in the register E:

$$S + \frac{1}{2} (\hat{V}_{[k,m]} + \hat{V}_{[k-1,m]}) \quad (32)$$

The value n stored in the register D in the microcomputer 205 is incremented by 1, and $\hat{V}_{[k, m]}$ is stored as $\hat{V}_{[k-1, m]}$ in the register B.

Each time the counter 113 generates the carry pulse CY, the microcomputer 205 effects the arithmetic operations of the equations (28), (32) to determine the estimated speed $\hat{V}_{[k, m]}$ as the detected speed.

When a pulse is generated by the pulse generator 102, a compensative arithmetic operation is carried out as follows:

An interrupt pulse issued by the OR gate 208 interrupts the microcomputer 205 to ascertain whether the flip-flop 123 has been set or not.

Since the flip-flop 123 has been set, as described above, the microcomputer 205 reads the content of the register loaded with the counted value of the counter 113, regards the read data as $T_{[n, m]}$, and increments the value n in the register D by 1. The microcomputer 205 also reads the digital current command id, regards this current command as $I_{[k, m]}$, and computes an estimated speed $\hat{V}_{[n,m]}$ according to the equation (29) based on $T_{[n, m]}$ and $\hat{V}_{[k-1, m]}$ in the register B which is regarded as $\hat{V}_{[n-1, m]}$.

Since the content S of the register E is indicative $$\sum_{k=1}^{n-1} \frac{1}{2} (\hat{V}_{[k-1,m]} + \hat{V}_{[k,m]}), \gamma_{[m]}$$

is computed according to the equation (31) using the data S, the value n in the register D, and $T_{[n, m]}$. $I_{l[m]}$ is computed from $\gamma_{[m]}$ and the equation (22), and the result is stored as $I_{l[m-1]}$ in the register C. The speed $V_{[n, m]}$ is computed according to the equation (30) and stored in the register B as an initial value which is regarded as the detected speed. The values n, S in the registers D, E are cleared to zero, and the flip-flop 123 is reset.

The above operation is repeated to detect the speed. While in the above embodiment a current feedback loop is employed and a current command is used, the current of the motor may directly be read with an A/D converter as shown in FIG. 6.

Comparison between the equations (21) and (31) clearly indicates that the equation (31) has no summation (sigma) symbol in the denominator, and one term in the equation (21) has to be multiplied by $T_{[k, m]}$ for each of 1 through n of k. Therefore, the embodiment using the equation (31) is simpler and shorter in effecting the arithmetic operations than the embodiment using the equation (21). This results from the assumption, given at first in the description of the embodiment, that $T_{[k, m]} = \Delta T$ as indicated by the equation (26).

Another embodiment of the present invention is described.

Since $T_{[k, m]}/\Delta T$ in the equations (29) through (31) takes values from 0 to 1, $T_{[k, m]}/\Delta T$ may be regarded as 0 in these equations when n is large. Thus, the equations (29) through (31) can be modified into the following equations:

$$V_{[n,m]} = \hat{V}_{[n-1,m]} + \frac{Kt}{J} \Delta T \gamma_{[m]} (n - 1) \quad (33)$$

$$\gamma_{[m]} = \frac{\frac{\Delta X}{\Delta T} - \sum_{k=1}^{n-1} \frac{1}{2} (\hat{V}_{[k,m]} + \hat{V}_{[k-1,m]})}{\frac{Kt}{J} \cdot \frac{\Delta T}{2} (n - 1)^2} \quad (34)$$

FIG. 11 is a block diagram of another embodiment which uses the simplified equations (33) and (34). Identical parts in FIG. 11 are denoted by identical reference characters in FIG. 10. The embodiment shown in FIG. 11 is different from that of FIG. 10 as follows:

Since no value of $T_{[n, m]}$ is necessary in this embodiment, the register 114 and the AND gate 209 shown in FIG. 10 are not required.

When no pulse is generated by the pulse generator 102 in FIG. 11, an interrupt pulse iTP is produced each time the counter 113 counts pulses up to a prescribed value to generate a carry pulse CY, whereupon the microcomputer 205 is interrupted.

In the interrupt routine, the microcomputer 205 ascertains whether the flip-flop 123 has been set or not. Since no pulse is generated by the pulse generator 102, the flip-flop 123 has not been set, and the microcomputer 205 reads a digital current command as $I_{[k, m]}$, reads $\hat{V}_{[k-1, m]}$ from the register B, and $I_{l[m-1]}$ from the register C. The microcomputer 205 computes the estimated speed $\hat{V}_{[k, m]}$ using the equation (28), and regards the computed speed as the detected speed.

Then, the arithmetic operation of the equation (32) is carried out. The result is stored as S in the register E, and the value n in the register D is incremented by 1.

When a pulse is generated by the pulse generator 102, the microcomputer 205 is placed into an interrupt routine. At the same time, the flip-flop 123 is set and the counter 113 is cleared and starts counting pulses from an initial value.

Upon entering the interrupt routine, the microcomputer 205 detects that the flip-flop 123 has been set, and computes the amount of compensation. At this time, the content S of the register E represents:

$$\sum_{k=1}^{n-1} \frac{1}{2} (\hat{V}_{[k-1,m]} + \hat{V}_{[k,m]})$$

Therefore, using this content S, and incrementing the data n in the register D by 1, $\gamma_{[m]}$ is computed according to the equation (34). The speed $V_{[n, m]}$ is computed according to the equation (33) based on [m] and n and is used as the detected speed. The speed $V_{[n, m]}$ is stored as an initial value in the register B, the data n and D in the registers D, E are cleared to zero, and the flip-flop 123 is reset. The values of registers B-E are all reset at zero when the microcomputer 205 is first initialized.

The foregoing cycle of operation is repeated to detect the speed. Instead of reading the current command, the current of the motor may directly be read in the above embodiment.

As is apparent from a comparison between the equations (29) and (30), and (33), the computation of the speed $V_{[n, m]}$ according to the equation (3) is simpler. The computation of $\gamma_{[m]}$ according to the equation (34) is simpler since it has no term corresponding to $T_{[n, m]}$ in the equation (31). Inasmuch as the embodiment of FIG. 11 is simpler in arrangement than the embodiment of FIG. 10, the required computations are simpler in the embodiment of FIG. 11 than in the embodiment of FIG. 10.

As mentioned above, when the actual speed is varied as indicated by the solid line in FIG. 12, the detected speed is as shown by the dot-and-dash line according to the method of the invention, and any time delay to which the method of the invention is subjected is caused only by the time required for the computations. Consequently, the method of the invention can detect the speed highly accurately with only a short time delay even when the motor rotates at low speed.

In FIG. 12(a) and 12(b), both of the line of the speeds detected by the method illustrated in FIG. 6 and the line of the speeds detected according to the present invention, are actually of stepwise configurations.

With the present invention, as described above in detail, the formulas for computation are derived from principles entirely different from those of the prior art. Any delay in detecting the speed of rotation of the motor is caused only by the time required for the microcomputer to effect necessary computations. Therefore, the detection delay is not dependent on the speed, and will not become larger as the speed is lower unlike the conventional methods. The present invention is thus highly advantageous for practical purposes in that the gain of the speed control loop can be increased even upon low-speed rotation, and extremely accurate positioning and highly accurate, high-speed speed control can be effected.

The present invention is not limited to the illustrated detection of the speed of a DC motor, but is applicable to the speed of other type motors and moving bodies driven thereby.

Although certain preferred embodiments have been shown and described, it should be understood that many changes and modifications may be made therein without departing from the scope of the appended claims.

What is claimed is:

1. A method of detecting the speed of a motor, the output shaft of which is connected to a pulse generator for generating pulse signals depending on the angular displacement of the motor, the method comprising the steps of (a) setting an initial value which is used to estimate the speed and an estimated value of the variable representing the torque disturbance both at zero, (b) estimating the speed at the time when a sampling pulse is generated, by integrating the sum of the variable representing the motor torque and the estimated value of the variable representing the torque disturbance with the prior initial value as an initial value, each time the sampling pulse is generated, until the pulse generator generates a pulse signal, (c) calculating the variable representing the torque disturbance when the pulse signal is generated, by using the time period between the time step (a) is executed and the time the pulse signal is generated and the estimated values of the speed calculated at step (b) between this time period, (d) calculating the real speed at the time when the pulse signal is generated, by compensating the speed estimated just before this time, using the amount of compensation for the torque disturbance which is the difference between the variable representing the torque disturbance and the estimated value of the variable representing the torque disturbance, (e) replacing the initial value which is used to estimate the speed by the real speed calculated at step (d), and replacing the estimated value of the variable representing the torque disturbance by the prior variable representing the torque disturbance calculated at step (c), (f) estimating the speed at the time when the sampling pulse is generated, by integrating the sum of the variable representing the motor torque and the estimated value of the variable representing the torque disturbance with the initial value replaced at step (e) as an initial value, each time the sampling pulse is generated, until the pulse generator generates a pulse signal, (g) calculating the variable representing the torque disturbance when the pulse signal is generated, by using the time period between the time the preceding pulse signal is generated and the time the present pulse signal is generated and the estimated values of the speed calculated at step (f) between this time period, (h) calculating the real speed at the time when the pulse signal is generated, by compensating the speed estimated just before this time, using the amount of compensation for the torque disturbance which is the difference between the variable representing the torque disturbance and the estimated value of the variable representing the torque disturbance, (i) replacing the initial value which is used to estimate the speed by the real speed calculated at step (h), and replacing the estimated value of the variable representing torque disturbance by the prior variable representing the torque disturbance calculated at step (g), (j) estimating the speed at the time when the sampling pulse is generated, by integrating the sum of the variable representing the torque disturbance with the initial value replaced at step (i) as an initial value, each time the sampling pulse is generated, until the pulse generator generates a pulse signal, and (k) repeating steps (g)-(j).

2. A method of detecting the speed of a moving body driven by a motor provided with a pulse generator for generating pulse signals depending on the displacement of the moving body, the method comprising the steps of (a) setting an initial value which is used to estimate the speed and an estimated value of the variable representing the torque disturbance both at zero, (b) estimating the speed at the time when a sampling pulse is generated, by integrating the sum of the variable representing the motor torque and the estimated value of the variable representing the torque disturbance with the prior initial value as an initial value, each time the sampling pulse is generated, until the pulse generator generates a pulse signal, (c) calculating the variable representing the torque disturbance when the pulse signal is generated, by using the time period between the time step (a) is executed and the time the pulse signal is generated and the estimated values of the speed calculated at step (b) between this time period, (d) calculating the real speed at the time when the pulse signal is generated, by compensating the speed estimated just before this time, using the amount of compensation for the torque disturbance which is the difference between the variable representing the torque disturbance and the estimated value of the variable representing the torque disturbance, (e) replacing the initial value which is used to estimate the speed by the real speed calculated at step (d), and replacing the estimated value of the variable representing the torque disturbance by the prior variable representing the torque disturbance calculated at step (c).

(f) estimating the speed at the time when the sampling pulse is generated, by integrating the sum of the variable representing the motor torque and the estimated value of the variable representing the torque disturbance with the initial value replaced at step (e) as an initial value, each time the sampling pulse is generated, until the pulse generator generates a pulse signal, (g) calculating the variable representing the torque disturbance when the pulse signal is generated, by using the time period between the time the preceding pulse signal is generated and the time the present pulse signal is generated and the estimated values of the speed calculated at step (f) between this time period, (h) calculating the real speed at the time when the pulse signal is generated, by compensating the speed estimated just before this time, using the amount of compensation for the torque disturbance which is the difference between the variable representing the torque disturbance and the estimated value of the variable representing the torque disturbance, (i) replacing the initial value which is used to estimate the speed by the real speed calculated at step (h), and replacing the estimated value of the variable representing torque disturbance by the prior variable representing the torque disturbance calculated at step (g), (j) estimating the speed at the time when the sampling pulse is generated, by integrating the sum of the variable representing the torque disturbance with the initial value replaced at step (i) as an initial value, each time the sampling pulse is generated, until the pulse generator generates a pulse signal, and (k) repeating the steps (g)-(j).

3. A method of detecting the speed of a linear motor provided with a pulse generator for generating pulse signals depending on the displacement of the moving body, the method comprising the steps of (a) setting an initial value which is used to estimate the speed and an estimated value of the variable representing the thrust disturbance both at zero, (b) estimating the speed at the time when a sampling pulse is generated, by integrating the sum of the variable representing the motor thrust and the estimated value of the variable representing the thrust disturbance with the prior initial value as an initial value, each time a sampling pulse is generated, until the pulse generator generates a pulse signal, (c) calculating the variable representing the thrust disturbance when the pulse signal is generated, by using the time period between the time step (a) is executed and the time the pulse signal is generated and the estimated values of the speed calculated at step (b) between this time period, (d) calculating the real speed at this time when the pulse signal is generated, by compensating the speed estimated just before this time, using the amount of compensation for the thrust disturbance which is the difference between the variable representing the thrust disturbance and the estimated value of the variable representing the thrust disturbance, (e) replacing the initial value which is used to estimate the speed by the real speed calculated at step (d), and replacing the estimated value of the variable representing the thrust disturbance by the prior variable representing the thrust disturbance calculated at step (c).

(f) estimating the speed at the time when the sampling pulse is generated, by integrating the sum of the variable representing the motor thrust and the estimated value of the variable representing the thrust disturbance with the initial value replaced at step (e) as an initial value, each time the sampling pulse is generated, until the pulse generator generates a pulse signal,
(g) calculating the variable representing the thrust disturbance when the pulse signal is generated, by using the time period between the time the preceding pulse signal is generated and the time the present pulse signal is generated and the estimated values of the speed calculated at step (f) between this time period,
(h) calculating the real speed at the time when the pulse signal is generated, by compensating the speed estimated just before this time, using the amount of compensation for the thrust disturbance which is the diffference between the variable representing the thrust disturbance and the estimated value of the variable representing the thrust disturbance,
(i) replacing the initial value which is used to estimate the speed by the real speed calculated at step (h), and replacing the estimated value of the variable representing the thrust disturbance by the prior variable representing the thrust disturbance calculated at step (g),
(j) estimating the speed at the time when the sampling pulse is generated, by integrating the sum of the variable representing the motor thrust and the estimated value of the variable representing the thrust disturbance with the initial value replaced at step (i) as an initial value, each time sampling pulse is generated, until the pulse generator generates a pulse signal, and
(k) repeating steps (g)–(j).

* * * * *